(12) United States Patent
Gobriel et al.

(10) Patent No.: US 10,623,311 B2
(45) Date of Patent: Apr. 14, 2020

(54) TECHNOLOGIES FOR DISTRIBUTED ROUTING TABLE LOOKUP

(71) Applicant: Intel Corporation, Santa Clara, CA (US)

(72) Inventors: Sameh Gobriel, Dublin, CA (US); Ren Wang, Portland, OR (US); Christian Maciocco, Portland, OR (US); Tsung-Yuan Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 15/717,287

(22) Filed: Sep. 27, 2017

(65) Prior Publication Data

US 2018/0019943 A1 Jan. 18, 2018

Related U.S. Application Data

(62) Division of application No. 14/264,912, filed on Apr. 29, 2014, now Pat. No. 9,847,935.

(51) Int. Cl.
*H04L 12/721* (2013.01)
*H04L 12/743* (2013.01)
(Continued)

(52) U.S. Cl.
CPC .............. *H04L 45/44* (2013.01); *H04L 45/02* (2013.01); *H04L 45/021* (2013.01); *H04L 45/7453* (2013.01); *H04L 45/306* (2013.01)

(58) Field of Classification Search
CPC ..... H04L 45/7453; H04L 43/50; H04L 45/00; H04L 45/306; H04L 12/5601; H04L 49/351

See application file for complete search history.

(56) References Cited

U.S. PATENT DOCUMENTS 7,151,775 B1 * 12/2006 Renwick .................. H04L 45/00
370/400
2004/0085953 A1 5/2004 Davis
(Continued)

OTHER PUBLICATIONS

Notice of Preliminary Rejection for Korean Patent Application No. 10-2015-0041601, dated May 2, 2016, 4 pages.
(Continued)

*Primary Examiner* — Kim T Nguyen
(74) *Attorney, Agent, or Firm* — Barnes & Thornburg LLP

(57) ABSTRACT

Technologies for distributed table lookup via a distributed router includes an ingress computing node, an intermediate computing node, and an egress computing node. Each computing node of the distributed router includes a forwarding table to store a different set of network routing entries obtained from a routing table of the distributed router. The ingress computing node generates a hash key based on the destination address included in a received network packet. The hash key identifies the intermediate computing node of the distributed router that stores the forwarding table that includes a network routing entry corresponding to the destination address. The ingress computing node forwards the received network packet to the intermediate computing node for routing. The intermediate computing node receives the forwarded network packet, determines a destination address of the network packet, and determines the egress computing node for transmission of the network packet from the distributed router.

17 Claims, 7 Drawing Sheets

(51) Int. Cl.
    *H04L 12/751*    (2013.01)
    *H04L 12/755*    (2013.01)
    *H04L 12/725*    (2013.01)

(56) References Cited

U.S. PATENT DOCUMENTS

| | | | |
|---|---|---|---|
| 2008/0080473 A1 | 4/2008 | Thubert et al. | |
| 2011/0016223 A1 | 1/2011 | Iannaccone et al. | |
| 2012/0124235 A1* | 5/2012 | Nandagopal | H04L 45/021 709/238 |
| 2013/0242996 A1 | 9/2013 | Varvello et al. | |

OTHER PUBLICATIONS

Notice of Second Preliminary Rejection for Korean Patent Application No. 2016-085870461, dated Nov. 29, 2016, 5 pages.
Wikipedia.Org, "Lookup table", Wikipedia, The Free Encyclopedia, retrieved from <http://en.wikipedia.org/w/index.php?title=Lookup_table&oldid=604105487>, edited Apr. 14, 2014, 7 pages.
Wikipedia.Org, "Bloom filter", Wikipedia, The Free Encyclopedia, retrieved from <http://en.wikipedia.org/w/index.php?title=Bloom_filter&oldid=602326401>, edited Apr. 14, 2014, 13 pages.
Hichem, et al., "IP address lookup for Internet routers using cache routing table" IJCSI International Journal of Computer Science Issues, vol. 7, Issue 4, No. 8, Jul. 2010, pp. 35-40.
Argyraki et al., "Can Software Routers Scale?", PRESTO '08 Proceedings of the ACM Workshop on Programmable Routers for Extensible Services of Tomorrow, Aug. 22, 2008, 6 pages.
Chen et al., "A Reliable Broadcast/Multicast Scheme for Multihop Mobile Ad Hoc Networks", IEICE Transactions on Communications, vol. E89-B, No. 3, Mar. 2006, pp. 867-878.
1st Office Action for Chinese Patent Application 201510136802.X, dated Oct. 18, 2017, 5 pages.
Second Office action in Chinese patent application No. 201510136802.X, dated Mar. 5, 2018, including machine translation (9 pages).

* cited by examiner

TECHNOLOGIES FOR DISTRIBUTED ROUTING TABLE LOOKUP

CROSS-REFERENCE TO RELATED APPLICATIONS

The present application is a divisional application of U.S. patent application Ser. No. 14/264,912, entitled "TECHNOLOGIES FOR DISTRIBUTED ROUTING TABLE LOOKUP", which was filed on Apr. 29, 2014.

BACKGROUND

Modern computing devices are becoming ubiquitous tools for personal, business, and social uses. As such, many modern computing devices are capable of connecting to various data networks, including the Internet and corporate intranets, to retrieve and receive data communications over such networks. Oftentimes, a computing device connected to one network needs to communicate with a computing device connected on a different network.

A router is a device that forwards data communications between two or more networks. To do so, routers typically include a routing table to determine the particular networks to which incoming network packets should be forwarded. Traditional core routers are dedicated hardware devices configured to support hundreds of external ports all running at line rate and a routing table with millions of entries. However, such core routers are often expensive and typically require proprietary hardware components to be used. Additionally, hardware-based routers often include less functionality and are more difficult to configure and update than other types of routers such as, for example, software-based routers.

A software router or a router cluster is a group of interconnected computing nodes (e.g., off-the-shelf servers, desktop computers, etc.) configured to operate together to route network packets between two or more networks or other end points. To operate in such a fashion, each computing node of the software router must typically keep a replica of the entire routing table. As such, as the number of networks connected to the software router grows, so too does the routing table. Consequently, the larger the routing table becomes, more time and computing resources (e.g., memory, storage, processing cycles, etc.) are required to perform a routing table lookup.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
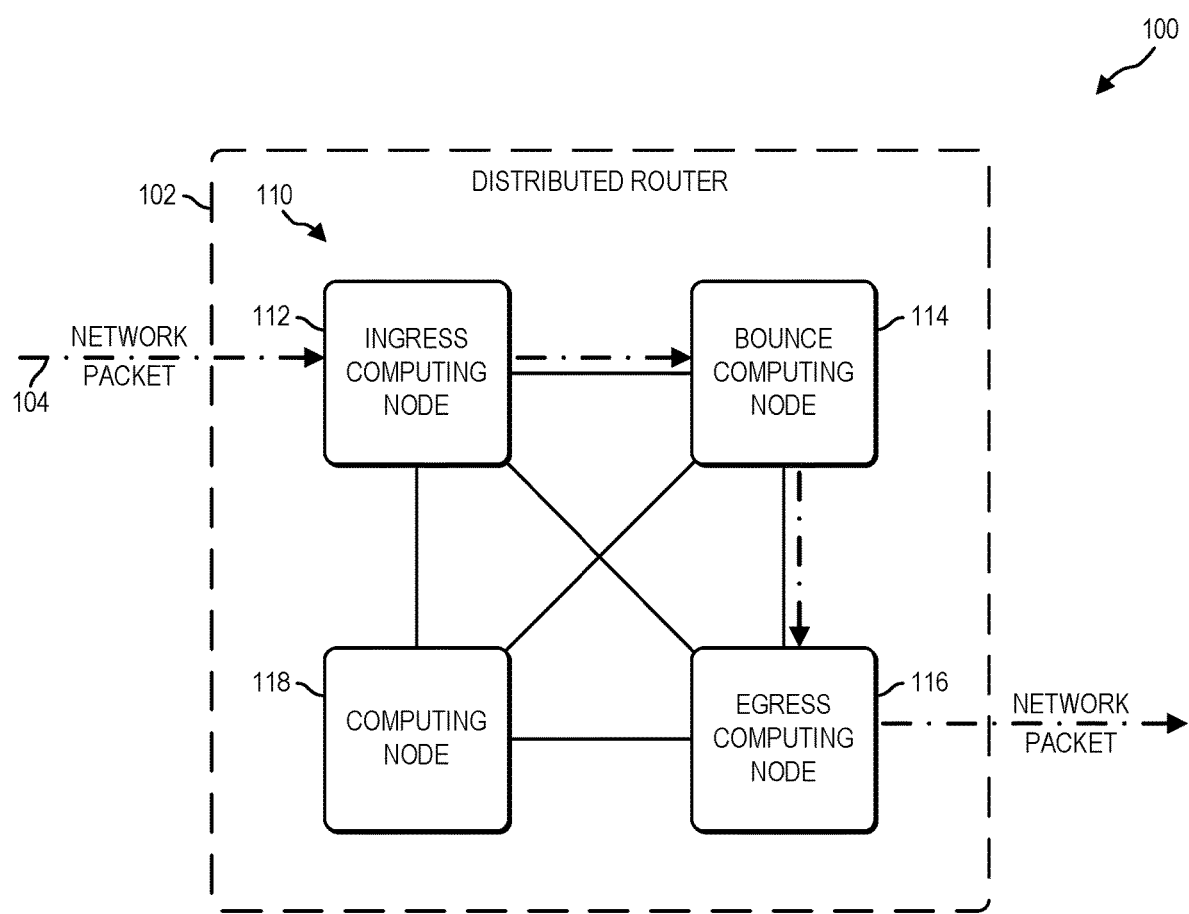
FIG. 1 is a simplified block diagram of at least one embodiment of a system for distributed routing table lookup via a distributed router including a number of computing nodes.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

Figure 2:
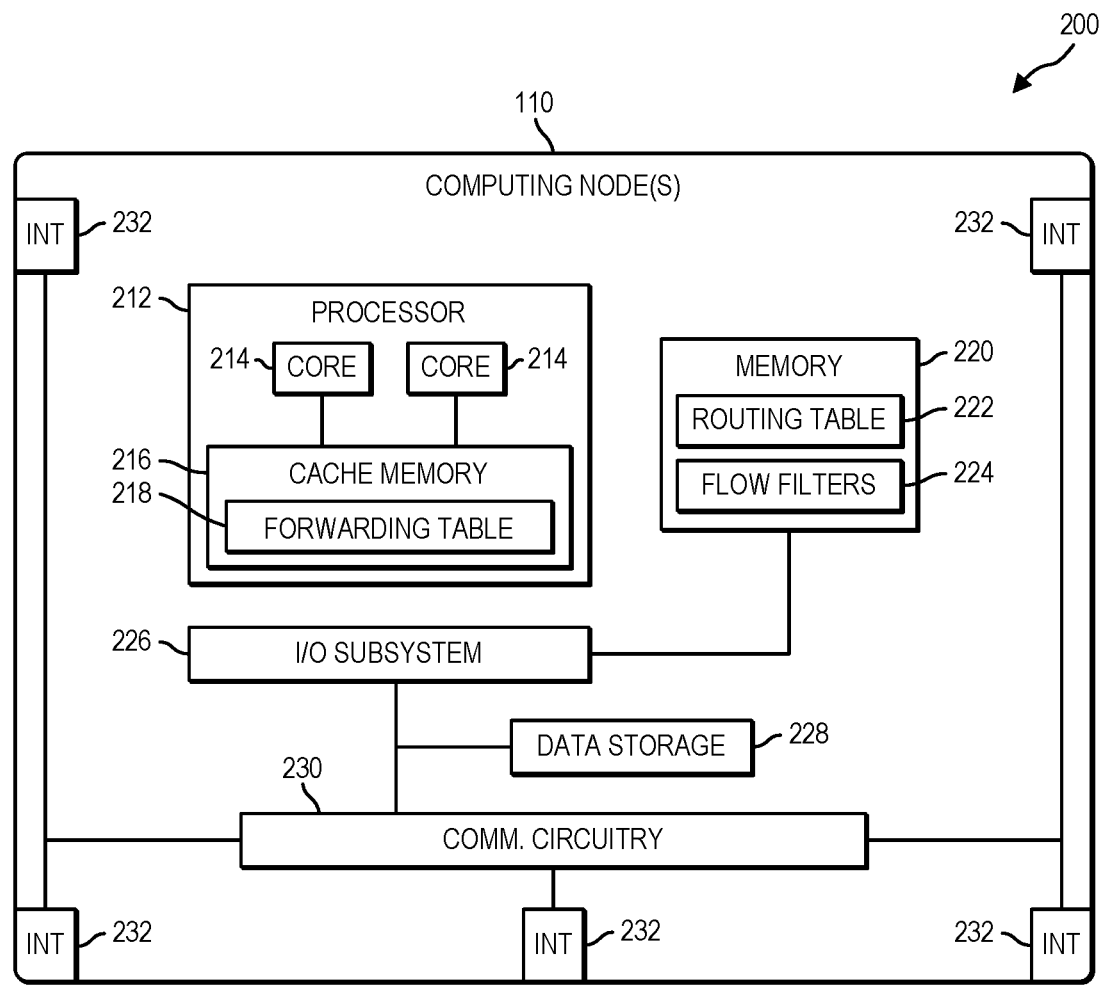
FIG. 2 is a simplified block diagram of at least one embodiment of the computing nodes of the distributed router of the system of FIG. 1.

Referring now to FIGS. 1 and 2, in an illustrative embodiment, a system 100 for distributed routing table lookup via a plurality of computing nodes 110 of a distributed router 102 (e.g., a cluster router). Each of the computing nodes 110 may be communicatively coupled to any number of different networks and/or subnetworks. As such, any of the computing nodes 110 may receive network packets originating from one network and, based on a routing table of the distributed router 102, may forward the network packets to a different network. In some embodiments, responsibility for routing network packets according to a routing table of the distributed router 102 is divided up among the plurality of computing nodes 110. That is, each computing node 110 of the distributed router 102 may be responsible for looking up a different portion of network routing entries of a global routing table 222 of the distributed router 102 (see FIG. 2).

In the illustrative embodiment, the distributed router 102 includes an "ingress" computing node 112, a "bounce" or "intermediate" computing node 114, and an "egress" computing node 116. Of course, in some embodiments, the distributed router 102 of the system 100 may also include one or more other computing nodes 110 (e.g., the computing node 118). In use, the ingress computing node 112 of the distributed router 102 receives a network packet 104 from a source computing device (e.g., a network switch, a network router, an originating computing device, etc.) external to the distributed router 102. It should be appreciated that any of the other computing nodes 110 illustratively shown in FIG. 1 may instead receive the network packet 104 from the source computing device. As such, the particular computing node 110 receiving the network packet 104 may be designated as the "ingress" computing node 112 and is referred to as such in the following description.

Upon receipt of the network packet 104, the ingress computing node 112 determines the bounce computing node 114 responsible for determining where to route the received network packet 104. That is, the ingress computing node 112 determines which of the other computing nodes 110 should perform a routing table lookup for the particular packet. To do so, in some embodiments, the ingress computing node 112 generates a hash key based on the destination internet protocol (IP) address of the received network packet 104. In some embodiments, the hash key may be embodied as the least two significant bits of the binary representation of the destination IP address (e.g., "00," "01," "10," or "11"). The generated hash key is compared to one or more flow filters 224 (see FIG. 2), which include corresponding index hash keys (e.g., "00," "01," "10," or "11") generated from the least two significant bits of the binary representation of the network routing entries maintained in a routing table 222 of the distributed router 102. Each index hash key corresponds to a different computing node 110 (e.g., bounce node) of the distributed router 102. As such, the ingress computing node 112 determines the particular bounce computing node 114 based on which computing node 110 is associated with an index hash key that matches the hash key generated from the destination IP address. The ingress computing node 112 then forwards the received network packet 104 to the determined bounce computing node 114 without performing a routing table lookup. It should be appreciated that although the ingress computing node 112 generates a hash key based on the destination IP address of the received network packet 104 in the illustrative embodiment, the ingress computing node 112 may generate the hash key based on any other type of information and/or a combination of information from the received network packet 104. For example, in other embodiments, the hash key generated by the ingress computing node 112 may be embodied as all or a portion of a 5-tuple (e.g., the destination IP address, a destination port number, a source IP address, a source port number, and a protocol) of the received network packet 104.

Upon receipt of the network packet 104, the bounce computing node 114 determines where to route the network packet 104 based on the destination IP address. To do so, the bounce computing node 114 looks up a corresponding network routing entry from a forwarding table 218 stored in cache memory 216 of the bounce computing node 114 (see FIG. 2). As discussed in more detail below, the forwarding table 218 of the bounce computing node 114 includes a set (e.g., subset, portion, etc.) of network routing entries obtained from the routing table 222 of the distributed router 102. The set of network routing entries maintained in the forwarding table 218 of the bounce computing node 114 is different from the other sets (e.g., subsets, portions, etc.) of network routing entries stored in the forwarding tables 218 of the other computing nodes 110. The bounce computing node 114 determines the particular egress computing node 116 responsible for egress of the network packet 104 from the distributed router 102. The egress computing node 116 then transmits the network packet 104 out of the distributed router 102. It should be appreciated that only performing expensive lookup operations on bounce computing nodes 114 responsible for different portions of the routing table 222, resources (e.g., memory, storage, processing cycles, etc.) of the individual computing nodes 110 (or the distributed router 102 as a whole) may be preserved and/or latency may be reduced. That is, by not performing a lookup operation on each computing node 110 of the distributed router 102 (e.g., the ingress computing node 112, the bounce computing node 114, and the egress computing node 116) that receives the network packet 104, overall performance of the distributed router 102 may be improved.

The distributed router 102 (e.g., cluster router) may be embodied as a group of individual computing nodes 110 acting in concert to perform the functions described herein. As illustratively shown in FIG. 1, the distributed router 102 may include multiple computing nodes 110 communicatively coupled to each other according to a fully connected mesh networking topology. It should be appreciated, however, that each computing node 110 may be communicatively coupled to the other computing nodes 110 according to any other networking topology. For example, each computing node 110 may be communicatively coupled to the other computing nodes 110 according to, among others, a switched network topology, a Clos network topology, a bus network topology, a star network topology, a ring network topology, and/or any combination thereof. Each of the computing nodes 110 of the distributed router 102 may be configured to perform any portion of the routing operations (e.g., ingress operations, routing operations, egress operations, etc.) for the distributed router 102 based on the particular computing node 110 that receives a network packet 104 from a computing device external to the distributed router 102 (e.g., the ingress computing node 112), the particular computing node 110 responsible for determining where to route the received network packet 104 (e.g., the bounce computing node 114), and the particular computing node 110 determined for egress of the network packet 104 out of the distributed router 102 (e.g., the egress computing node 116).

The distributed router 102 may maintain a global routing table including a plurality of network routing entries obtained from current and/or historical network communications and/or connections between the computing nodes 110 of distributed router 102 and other computing devices external to the distributed router 102 (e.g., a network switch, a network router, an originating computing device, etc.). As discussed below, in some embodiments, a copy of the global routing table may be stored in memory of each computing node 110 (e.g., the routing table 222 in the memory 220 illustratively shown in FIG. 2). It should be appreciated that as network connections and/or computing nodes 110 are added to the distributed router 102, the size of the routing table of the distributed router 102 increases. As a result, the amount of time and resources (e.g., memory, storage, processing cycles, etc.) required by a computing node 110 to perform a routing table lookup using the routing table 222 is also increased. However, as discussed in more detail below, each computing node 110 of the distributed router 102 is configured to be responsible for only routing network packets 104 that correspond to a different set (e.g., a subset or portion) of the global routing table 222. As such, each computing node 110 of the distributed router 102 may maintain a portion of the routing table 222 in a separate forwarding table in a processor cache memory (e.g., the forwarding table 218 and the cache memory 216 illustratively shown in FIG. 2). Each forwarding table 218 of each computing node 110 includes a different set (e.g., a subset or portion) of network routing entries obtained from the routing table 222 of the distributed router 102. It should be appreciated that although the forwarding tables 218 of the illustrative embodiment are described as being separate forwarding tables 218 stored in the cache memory 216 of each computing node 110, the forwarding tables 218 of other embodiments may not be structured or formatted as tables. For example, in some embodiments, the forwarding tables 218 of each of the computing nodes 110 may be embodied as a collection or group of the individual network routing entries loaded into the cache memory 216 for subsequent retrieval.

The computing node(s) 110 may be embodied as, or otherwise include, any type of computing device capable of performing the functions described herein including, but not limited to a server computer, a networking device, a rack computing architecture component, a desktop computer, a laptop computing device, a smart appliance, a consumer electronic device, a mobile computing device, a mobile phone, a smart phone, a tablet computing device, a personal digital assistant, a wearable computing device, and/or other type of computing device. As illustratively shown in FIG. 2, the computing node(s) includes a processor 212, a memory 220, an input/output (I/O) subsystem 226, communication circuitry 230, and a data storage 228. Of course, the computing node(s) 110 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 220, or portions thereof, may be incorporated in the processor 212 in some embodiments.

The processor 212 may be embodied as any type of processor capable of performing the functions described herein. For example, in some embodiments, the processor 212 may be embodied as a single core processor, digital signal processor, microcontroller, or other processor or processing/controlling circuit. In other embodiments, such as the one illustratively shown in FIG. 2, the processor 212 may be embodied as multi-core processor having multiple processor cores 214. The processor 212 may include cache memory 216 for storing instructions and/or data for execution. In some embodiments, the cache memory 216 may also store a forwarding table 218 to facilitate routing received network packets 104. The forwarding table 218 of each computing node 110 may store a different set (e.g., a portion, subset, etc.) of network routing entries obtained from a global routing table of the distributed router 102. As such, the forwarding table 218 of each computing node 110 is smaller in size (e.g., includes less routing table entries) than the global routing table 222, which includes all of the routing table entries of the distributed router 102. In some embodiments, the forwarding table 218 of each computing node 110 may not be structured or embodied as information formatted in a table. For example, the forwarding table 218 of each of the computing nodes 110 may be embodied as a collection or group of the individual network routing entries loaded into the cache memory 216 for subsequent retrieval.

As discussed in more detail below, a copy of the global routing table 222 of the distributed router 102 may be stored in the memory 220 of each computing node 110. In some embodiments, all or a portion of the different set of network routing table entries may obtained from the routing table 222 and preloaded into the forwarding table 218 of a computing node 110 upon initialization or otherwise upon joining the distributed router 102. Additionally or alternatively, all or a portion of the different set of network routing entries may obtained from the routing table 222 and loaded into the forwarding table 218 in response to receiving one or more network packets 104 destined for an IP address and/or an IP subnetwork for which a corresponding network routing entry does not yet exist in the forwarding table 218. It should be appreciated that although the forwarding tables 218 are described as being stored in the cache memory 216 of the computing nodes 110 in the illustrative embodiment, the forwarding tables 218 may be stored in other data storage devices of the computing nodes 110 in other embodiments. For example, in embodiments wherein the size of a forwarding table 218 for a particular computing node 110 exceeds the amount of storage available in the cache memory 216, the forwarding table 218 may instead be stored in the memory 220 of the computing node 110.

The memory 220 may be embodied as any type of volatile or non-volatile memory or data storage capable of performing the functions described herein. In operation, the memory 220 may store various data and software used during operation of the computing node(s) 110 such as operating systems, applications, programs, libraries, and drivers. The memory 220 is communicatively coupled to the processor 212 via the I/O subsystem 226, which may be embodied as circuitry and/or components to facilitate input/output operations with the processor 212, the memory 220, and other components of the computing node(s) 110. For example, the I/O subsystem 226 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 226 may form a portion of a system-on-a-chip (SoC) and be incorporated, along with the processor 212, the memory 220, and other components of the computing node(s) 110, on a single integrated circuit chip.

In some embodiments, the memory 220 includes the routing table 222 of the distributed router 102 (e.g., the cluster router). As discussed in more detail below, the routing table 222 includes a plurality of network routing entries, each having information that corresponds to a different network destination (e.g., a network address, a destination network or subnet, a remote computing device etc.). For example, in some embodiments, each network routing entry may include information indicative of a destination IP address (e.g., an IP address of a target computing device and/or a destination subnet), a gateway IP address corresponding to another computing node 110 through which network packets for the destination IP address should be sent, and/or an egress interface of the computing node 110 through which the network packets for the destination IP address are sent to the gateway IP address. It should be appreciated that the routing table 222 may include any other type of information to facilitate routing a network packet to its final destination.

Additionally, in some embodiments, the memory 220 may also include various flow filters 224. As discussed in more detail below, an ingress computing node 112 may use the flow filters 224 to determine, based on a hash value of the destination IP address of the received network packet 104, which of the other computing nodes 110 (e.g., the bounce computing node 114) of the distributed router 102 is responsible for routing the received network packet 104 to the egress computing node 116 for subsequent transmission out of the distributed router 102. In some embodiments, the flow filters 224 may be embodied as one or more rules defining which computing nodes 110 are responsible for routing network packets 104 destined to what IP addresses and/or subnets. Additionally or alternatively, the flow filters 224 may be embodied as a flow filter table (e.g., the flow filter table 400 illustratively shown in FIG. 4) upon which a lookup or mapping operation may be performed by the ingress computing node 112. In either case, each flow filter 224 may be associated with a different computing node 110 and may include a corresponding index hash key indicative of the particular set of network routing entries of the routing table 222 for which that computing node 110 is responsible. In some embodiments, the index hash keys may be generated based on the least two significant bits of the binary representation of the destination IP address and/or destination subnetwork for each network routing entry of the routing table 222 of the distributed router 102. In such embodiments, a total of four different index hash keys may be generated (e.g., "00," "01," "10," or "11"), one for each of the computing nodes 110 of the distributed router 102. In embodiments wherein the distributed router 102 includes more than four computing nodes 110, additional least significant bits of the binary representation of the destination IP address and/or destination subnetwork for each network routing entry of the routing table 222 may be used. For example, in embodiments wherein the distributed router 102 includes eight computing nodes 110, the three least significant bits of the binary representation of the destination IP address and/or destination subnetwork for each network routing entry of the routing table 222 may be used to generate a total of eight possible index hash keys (e.g., "000," "001," "010," "011," "100," "101," "110," and "111").

The communication circuitry 230 of the computing node(s) 110 may be embodied as any type of communication circuit, device, or collection thereof, capable of enabling communications between the computing node(s) 110 of the distributed router 102 (e.g., the cluster router) and/or other computing devices via one or more communication networks (e.g., local area networks, personal area networks, wide area networks, cellular networks, a global network such as the Internet, etc.). The communication circuitry 230 may be configured to use any one or more communication technologies (e.g., wireless or wired communications) and associated protocols (e.g., Ethernet, Wi-Fi®, WiMAX, etc.) to effect such communication. In the illustrative embodiment, the communication circuitry 230 includes or is otherwise communicatively coupled to one or more communication interfaces 232. The communication interfaces 232 may be configured to communicatively couple the computing node(s) 110 to any number of other computing nodes 110, networks (e.g., physical or logical networks), and/or external computing devices (e.g., computing devices not part of the distributed router 102).

The data storage 228 may be embodied as any type of device or devices configured for short-term or long-term storage of data such as, for example, memory devices and circuits, memory cards, hard disk drives, solid-state drives, or other data storage devices. For example, the data storage 228 may be configured to store one or more operating systems to be initialized and/or executed by the computing node(s) 110. In some embodiments, portions of the operating system(s) may be copied to the memory 220 during operations for faster processing and/or any other reason.

Figures 3, 4:
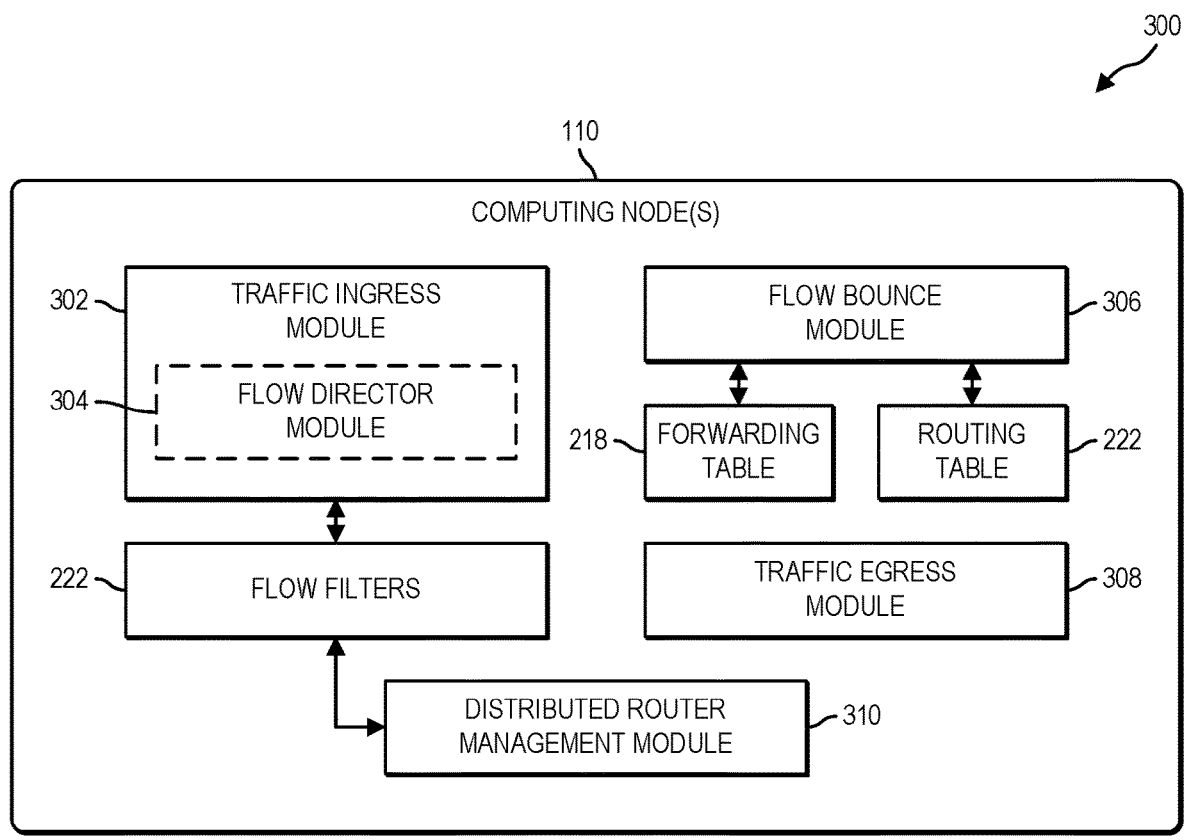
FIG. 3 is a simplified block diagram of at least one embodiment of an environment of the computing nodes of the distributed router of the system of FIG. 1.
FIG. 4 is an illustrative embodiment of a flow filter table that may be used by an ingress computing node of the distributed router of the system of FIG. 1 to determine an intermediate computing node.

Referring now to FIG. 3, in use, each of the computing nodes 110 establishes an environment 300 during operation. The illustrative environment 300 includes a traffic ingress module 302, a flow bounce module 306, a traffic egress module 308, and a distributed router management module 310. In some embodiments, the traffic ingress module 302 may include a flow director module 304 as discussed below. Each of the modules, logic, and other components of the environment 300 may be embodied as hardware, software, firmware, or a combination thereof. It should be appreciated that each computing node 110 may include other components, sub-components, modules, and devices commonly found in a computing device, which are not illustrated in FIG. 3 for clarity of the description. Additionally, it should be understood that although each of computing nodes 110 may establish the illustrative environment 300 during operation, the following discussion of that illustrative environment 300 is described with specific reference to a single computing node 110 for clarity of the description.

The traffic ingress module 302 is configured to receive network packet(s) 104 from a computing device external to the distributed router 102 (e.g., a network switch, a network router, an originating computing device, etc.). The received network packet(s) 104 may be embodied as internet protocol (IP) packets including a destination IP address of a target of the received network packet 104. Of course, the received network packet(s) 104 may include other types of information such as, for example, a destination port, a source IP address, a source port, protocol information, and/or a media access control (MAC) address. It should be appreciated, however, that the received network packet(s) 104 may be embodied as any other type of network packet in other embodiments. In some embodiments, the network packet(s) 104 may be received from an external computing device communicatively coupled to a communication interface 232 of the computing node 110. It should be appreciated that in embodiments wherein the traffic ingress module 302 receives the network packet(s) 104 from the external computing device, the computing node 110 may be referred to as the "ingress" computing node 112.

The traffic ingress module 302 is also configured to generate a hash key based on the destination IP address of the received network packet 104. In some embodiments, the traffic ingress module 302 may generate the hash key based on the least two significant bits of the binary representation of the destination IP address. For example, the hash key generated by the traffic ingress module 302 may include a value of "00," "01," "10," or "11" based on the least two significant bits of the binary representation of the destination IP address. It should be appreciated that any number of least significant bits may be used to generate the hash key. In some embodiments, the number of least significant bits used to generate the hash key may be determined based on, or otherwise as a function of, the total number of computing nodes 110 of the distributed router 102. For example, in the illustrative embodiment, the least two significant bits of the binary representation of the destination IP address are used to generate the hash key because distributed router 102 includes a total of four computing nodes 110, which is equivalent to the total number of different hash keys that could be generated from two binary bits (e.g., "00," "01," "10," or "11"). In embodiments wherein the distributed router 102 includes more than four computing nodes 110, additional least significant bits of the binary representation of the destination IP address may be used. For example, in embodiments wherein the distributed router 102 includes eight computing nodes 110, the three least significant bits of the binary representation of the destination IP address may be used to generate a total of eight possible hash keys (e.g., "000," "001," "010," "011," "100," "101," "110," and "111"). It should be appreciated that to facilitate later determination of the particular computing node 110 (e.g., the bounce computing node 114) responsible for routing the received network packet 104, the number of least significant bits used to generate the hash key may be substantially similar to the number of least significant bits used to generate the index hash key for each of the computing nodes 110 of the distributed router 102. It should be appreciated that, in some embodiments, the traffic ingress module 302 may generate the hash key based on any other type of information (or a combination of the different types of information) included in the network packet 104 (e.g., the 5-tuple, MAC address, etc.).

As shown in the illustrative embodiment of FIG. 3, the traffic ingress module 302 may include the flow director module 304. The flow director module 304 may be configured to determine the particular computing node 110 (e.g., the bounce computing node 114) responsible for routing the received network packet 104. That is, the flow director module 304 may determine the particular computing node 110 (e.g., the bounce computing node 114) that includes a forwarding table 218 having a network routing entry that corresponds to the destination IP address of the network packet 104 or is otherwise responsible for routing network packets 104 to the destination IP address and/or a corresponding destination subnet address. To do so, in some embodiments, the flow director module 304 is configured to compare the hash key generated based on the destination IP address of the network packet 104 to the index hash keys included in the flow filters 224. In such embodiments, the flow director module 304 determines the particular bounce computing node 114 based on determining which flow filter 224 includes an index hash key that matches the hash key generated from the destination IP address (or other types of information) of the network packet 104.

In embodiments wherein the computing node 110 is determined to be the bounce computing node 114, the flow bounce module 306 is configured to determine the particular computing node 110 (e.g., the egress computing node 116) that is responsible for transmitting the received network packet 104 from the distributed router 102 based on the target and/or final destination the network packet 104. To do so, the flow bounce module 306 may examine the network packet 104 to determine the destination IP address. Additionally or alternatively, the flow bounce module 306 may examine the network packet 104 to determine a 5-tuple (e.g., the destination IP address, a destination port number, a source IP address, a source port number, and a protocol) of the network packet 104. In some embodiments, the flow bounce module 306 may compare the destination IP address to a forwarding table 218 of the bounce computing node 114 and/or the routing table 222 of the distributed router 102. As discussed, each computing node 110 of the distributed router 102 includes a forwarding table 218 having (or is responsible for having) a different set (e.g., a subset or portion) of network routing entries obtained from the routing table 222 of the distributed router 102. As such, in some embodiments, the flow bounce module 306 may be configured to perform a lookup operation on the forwarding table 218 of the bounce computing node 114 to determine if a matching network routing entry exists. In some embodiments, if a matching network routing entry does not exist in the forwarding table 218, the flow bounce module 306 performs a lookup operation on the routing table 222 of the distributed router 102. It should be appreciated that performing a lookup operation on the forwarding table 218 of the bounce computing node 114, which includes a set (e.g., a subset or portion) of network routing entries obtained from the routing table 222, is faster and consumes significantly less resources (e.g., memory, storage, processing cycles, etc.) than performing a lookup operation on the entire routing table 222. Once identified, the flow bounce module 306 may utilize the matching routing entry to determine the egress computing node 116 for the network packet 104. In some embodiments, the flow bounce module 306 is configured to examine the network packet 104 to determine a MAC address included therein. In such embodiments, the flow bounce module 306 may be configured to compare the MAC address to the forwarding table 218 of the bounce computing node 114 and/or the routing table 222 of the distributed router 102. In that way, the bounce computing node 114 may facilitate Layer 2 switching of the received network packet 104.

The flow bounce module 306 is also configured to forward the network packet 104 to the determined egress computing node 116 for further processing. For example, in some embodiments, the egress computing node 116 may transmit the received network packet 104 from the distributed router 102 towards its final destination (e.g., a directly connected computing device external to the distributed router 102, another network device, other networks, etc.).

In embodiments wherein the computing node 110 is determined to be the egress computing node 116, the traffic egress module 308 is configured to transmit the network packet 104 out of the distributed router 102. That is, the traffic egress module 308 is configured to transmit the network packet 104 towards its final destination. In some embodiments, the final destination of the network packet 104 may be a computing device external to the distributed router 102 (e.g., not part of the cluster router). For example, the final destination of the network packet 104 may be an external computing device directly connected to one of the communication interfaces 232 of the egress computng node 116. In another example, the final destination of the network packet 104 may be an external computing device communicatively coupled to the egress computing node 116 via one or more networks.

The distributed router management module 310 is configured to synchronize data between the computing nodes 110 of the distributed router 102. For example, in some embodiments, the distributed router management module 310 may synchronize the flow filters 224 across the computing nodes 110 of the distributed router 102 to ensure that each computing node 110 has an updated set of flow filters 224. Additionally or alternately, the distributed router management module 310 may be configured to synchronize the routing table 222 across computing nodes 110 of the distributed router 102 to ensure that each computing node 110 has an updated version of the routing table 222 of the distributed router 102.

The distributed router management module 310 may also be configured to determine the status and/or availability of the other computing nodes 110 of the distributed router 102. For example, in some embodiments, the distributed router management module 310 may be configured to determine whether another computing node 110 is no longer available or is otherwise unreachable to route network packets 104 (e.g., act as a bounce computing node 114) for the distributed router 102. In such embodiments, the distributed router management module 310 may be configured to determine how the particular set of network routing entries of the routing table 222 for which the unavailable computing node 110 was responsible should be divided up and/or assigned among the remaining computing nodes 110 of the distributed router 102. In some embodiments, the distributed router management module 310 may update one or more of the flow filters 224 based on such a determination. For example, the distributed router management module 310 may update one or more of the flow filters 224 by reassigning the index hash key(s) associated with the unavailable computing node 110 to one or more of the remaining computing nodes 110.

Figure 5:
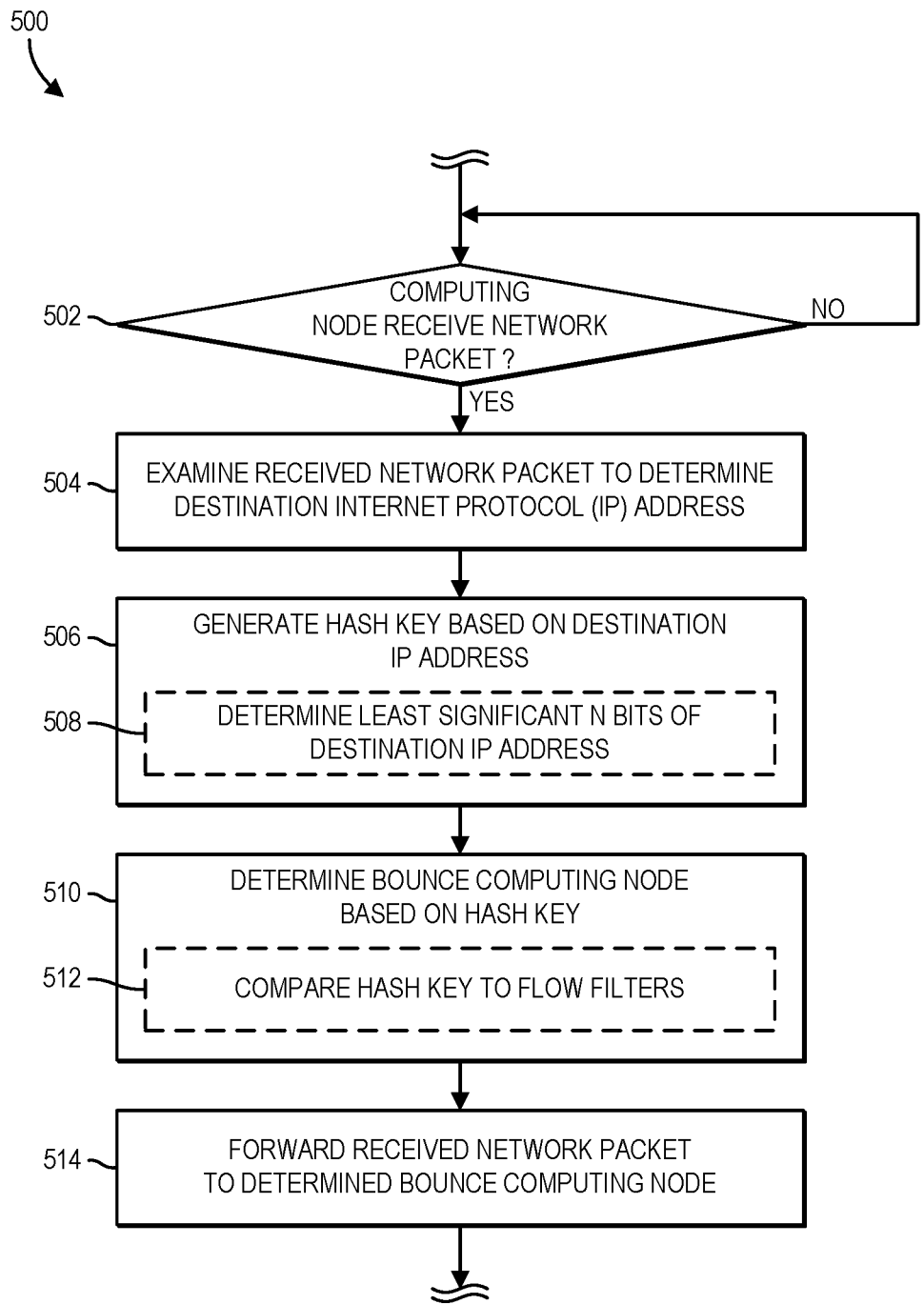
FIG. 5 is a simplified flow diagram of at least one embodiment of a method that may be executed by an ingress computing node of the distributed router of the system of FIG. 1 for distributed routing table lookup.

Referring now to FIG. 5, the ingress computing node 112 may execute a method 500 for distributed routing table lookup via the plurality of computing nodes 110 of the distributed router 102 (e.g., the cluster router). The method 500 begins with block 502 in which the ingress computing node 112 determines whether a network packet 104 is received from a computing device external to the distributed router 102 (e.g., a network switch, a network router, an originating computing device, etc.). To do so, the ingress computing node 112 may monitor the communication interface(s) 232 for the receipt of a new network packet 104. If in block 502, the ingress computing node 112 determines that a new network packet 104 is received, the method 500 advances to block 504. If, however, the ingress computing node 112 determines instead that a new network packet 104 has not been received, the method 500 loops back to block 502 and the ingress computing node 112 continues monitoring for receipt of a new network packet 104.

In block 504, the ingress computing node 112 examines the received network packet 104 to determine a target or destination address of the packet. The target or destination address of the received network packet 104 may correspond to a destination computing device directly connected to one of the computing nodes 110 of the distributed router 102 or an external destination computing device communicatively coupled to the distributed router 102 via one or more networks and/or networking devices. In some embodiments, the received network packet 104 may be embodied as an internet protocol (IP) packet including, among other types of information, a destination IP address of a target of the received network packet 104. In such embodiments, the ingress computing node 112 examines an IP header of the received IP network packet 104 to determine the destination IP address of the target.

In block 506, the ingress computing node 112 generates a hash key based on the destination IP address. In some embodiments, in block 508, the ingress computing node 112 may generate the hash key based on the least two significant bits of the binary representation of the destination IP address. For example, the hash key generated by the ingress computing node 112 may include a value of "00," "01," "10," or "11" based on the least two significant bits of the binary representation of the destination IP address. It should be appreciated that any number of least significant bits may be used to generate the hash key. In some embodiments, the number of least significant bits used to generate the hash key may be determined based on, or otherwise as a function of, the total number of computing nodes 110 of the distributed router 102.

In block 510, the ingress computing node 112 determines the particular computing node 110 (e.g., the bounce computing node 114) that is responsible for routing the received network packet 104. That is, the ingress computing node 112 determines the particular computing node 110 (e.g., the bounce computing node 114) that includes a forwarding table 218 having a network routing entry that corresponds to the destination IP address of the network packet 104 or is otherwise responsible for routing network packets to the destination IP address and/or a corresponding destination subnet address. To do so, in block 512, the ingress computing node 112 compares the hash key generated based on the destination IP address of the network packet 104 to one or more flow filters 224. Each flow filter 224 may be associated with a different computing node 110 and may include a corresponding index hash key, which as discussed, may be indicative of the particular set of network routing entries of the routing table 222 for which a particular computing node 110 is responsible. In some embodiments, the ingress computing node 112 compares the hash key generated from destination IP address of the network packet 104 to the index hash keys of the flow filters 224. In such embodiments, the ingress computing node 112 may determine or otherwise identify the particular computing node 110 (e.g., the bounce computing node 114) responsible for routing the network packet 104 based on finding a matching hash key/index hash key pair.

In block 514, the ingress computing node 112 forwards the network packet 104 to the determined bounce computing node 114 for further processing. For example, as discussed, the bounce computing node 114 may be configured to determine, based on the forwarding table 218 of the bounce computing node 114 or a portion of the network routing entries of the routing table 222 for which the bounce computing node 114 is responsible, an egress computing node 116 for transmission of the received network packet 104 from the distributed router 102.

In some embodiments, the ingress computing node 112 may execute the process of distributed routing table lookup (e.g., the method 500) based on information other than (or in addition to) the destination IP address of the received network packet 104. For example, in some embodiments, the ingress computing node 112 may examine the received network packet 104 to determine a 5-tuple (e.g., the destination IP address, a destination port number, a source IP address, a source port number, and a protocol) or a media access control (MAC) address (for Layer 2 switching) of the received network packet 104 (e.g., block 504). In such embodiments, the ingress computing node 112 may subsequently generate the hash key based on the determined 5-tuple or MAC address (e.g., block 506). The ingress computing node 112 may then forward the received network packet 104 to the particular computing node 110 (e.g., the bounce computing node 114) determined to be responsible for routing/switching the network packet based on comparing the generated hash key to the one or more flow filters 224 (e.g., blocks 510, 514).

Figure 6:
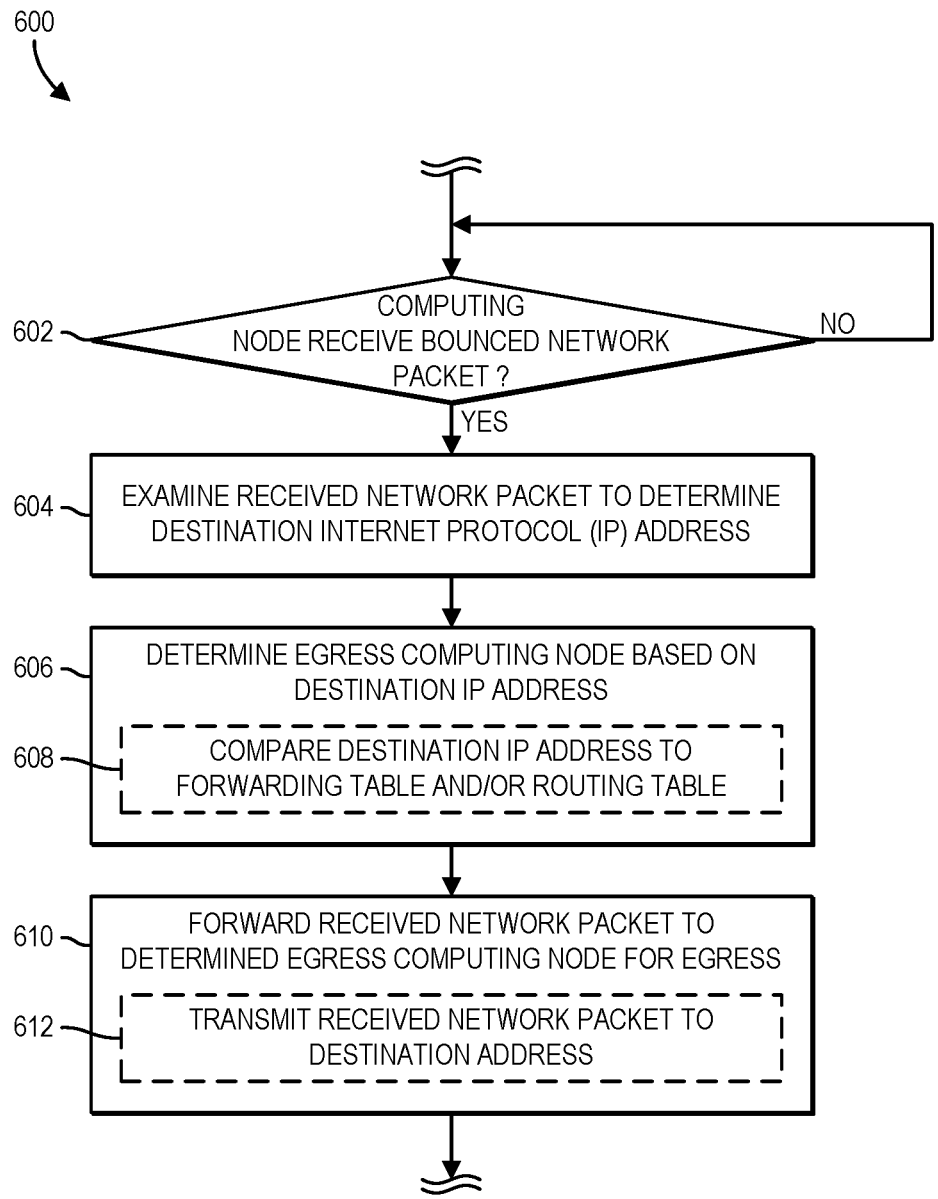
FIG. 6 is a simplified flow diagram of at least one embodiment of a method that may be executed by the intermediate computing node of the distributed router of the system of FIG. 1 for distributed routing table lookup.

Referring now to FIG. 6, the bounce computing node 114 may executed a method 600 for distributed routing table lookup via the plurality of computing nodes 110 of the distributed router 102 (e.g., the cluster router). The method 600 begins with block 602 in which the bounce computing node 114 determines whether a bounced (e.g., forwarded, transferred, etc.) network packet 104 has been received from the ingress computing node 112. If in block 602, the bounce computing node 114 determines that a bounced network packet 104 is received, the method 600 advances to block 604. If, however, the bounce computing node 114 determines instead that a bounced network packet 104 has not been received, the method 600 loops back to block 602 and the bounce computing node 114 continues monitoring for a bounced network packet 104.

In block 604, the bounce computing node 114 examines the received network packet 104 to determine a target or destination of the packet. In some embodiments, the received network packet 104 may be embodied as an internet protocol (IP) packet including, among other types of information, a destination IP address of a target of the received network packet 104. In such embodiments, the bounce computing node 114 examines the IP header of the received IP network packet 104 to determine the destination IP address of the target.

In block 606, the bounce computing node 114 determines the particular computing node 110 (e.g., the egress computing node 116) that is responsible for transmitting the received network packet 104 from the distributed router 102 based on the destination IP address. In some embodiments, in block 608, the bounce computing node 114 compares the destination IP address to a forwarding table 218 of the bounce computing node 114 and/or the routing table 222 of the distributed router 102. As discussed, each computing node 110 of the distributed router 102 includes a forwarding table 218 having (or is responsible for having) a different set (e.g., a subset or portion) of network routing entries obtained from the routing table 222 of the distributed router 102. As such, in some embodiments, the bounce computing node 114 may perform a lookup operation on its own forwarding table 218 to determine if a matching network routing entry exists. In some embodiments, if a matching network routing entry does not exist in the forwarding table 218, the bounce computing node 114 performs a lookup operation on the routing table 222. It should be appreciated that performing a lookup operation on the forwarding table 218 of the bounce computing node 114, which includes a set (e.g., a subset or portion) of network routing entries obtained from the routing table 222, is faster and consumes less resources (e.g., memory, storage, processing cycles, etc.) than performing a lookup operation on the entire routing table 222. Once identified, the bounce computing node 114 may utilize the matching routing entry to determine the egress computing node 116 for the network packet 104.

In block 610, the bounce computing node 114 forwards the network packet 104 to the determined egress computing node 116 for processing. For example, in some embodiments, the egress computing node 116 may transmit, in block 612, the received network packet 104 from the distributed router 102 towards its final destination (e.g., a directly connected computing device external to the distributed router 102, another network device, other networks, etc.).

In some embodiments, the bounce computing node 114 may execute the process of distributed routing table lookup (e.g., the method 600) based on information other than (or in addition to) the destination IP address of the network packet 104 bounced (e.g., forwarded, transmitted, etc.) by the ingress computing node 112. For example, in some embodiments, the bounce computing node 114 may examine the received network packet 104 to determine the 5-tuple (e.g., the destination IP address, a destination port number, a source IP address, a source port number, and a protocol) or the media access control (MAC) address (for Layer 2 switching) of the received network packet 104 (e.g., block 604). In such embodiments, the bounce computing node 114 may subsequently compare (e.g., lookup) the determined 5-tuple or MAC address to the forwarding table 218 of the bounce computing node 114 and/or the routing table 222 of the distributed router 102 to determine the particular computing node 110 (e.g., the egress computing node 116) that is responsible for transmitting the received network packet 104 from the distributed router 102 (e.g., block 608). Based on such a determination, the bounce computing node 114 may forward the received network packet 104 to the determined egress computing node 116 for further processing (e.g., block 610). In that way, the bounce computing node 114 may forward and/or switch network packets (e.g., perform routing table and/or forwarding table lookups) based on information other than or in addition to the destination IP address.

Figure 7:
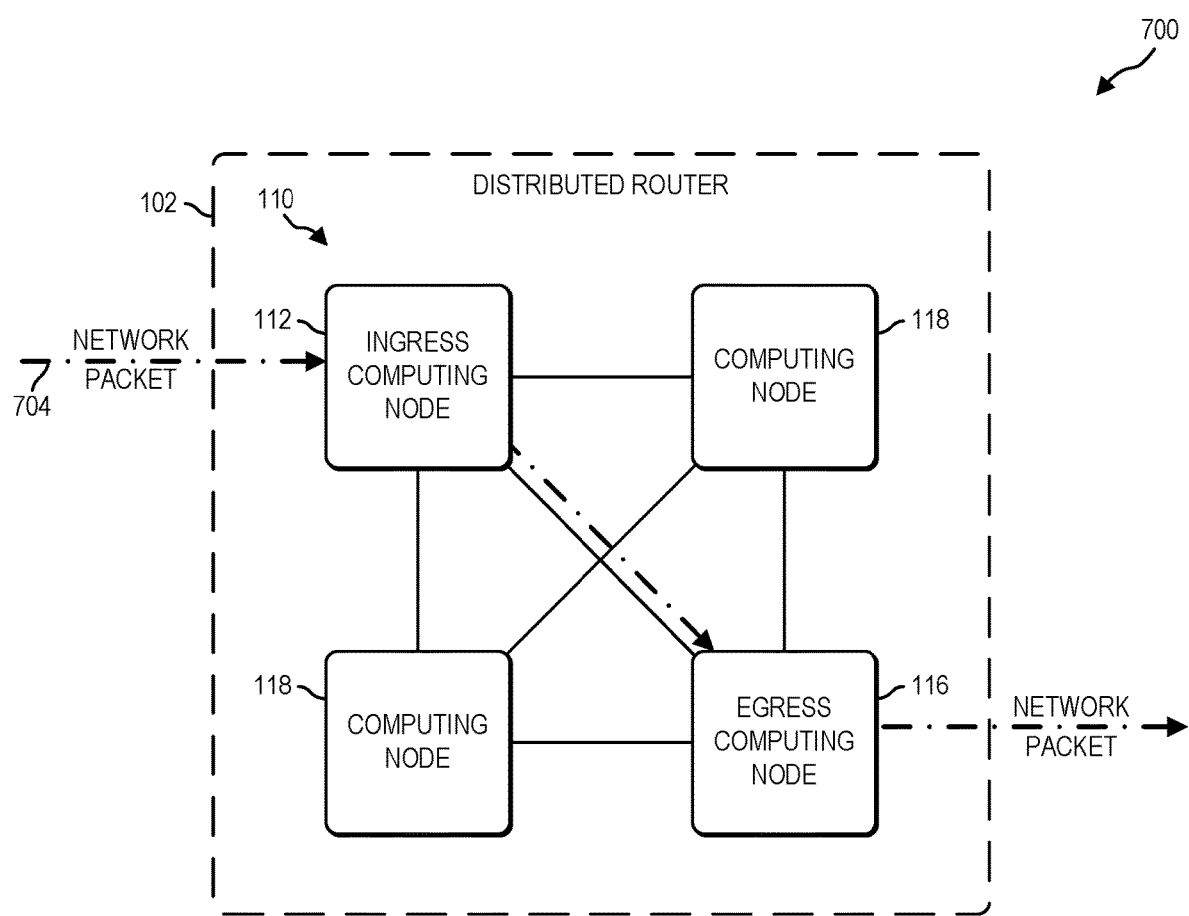
FIG. 7 is an illustrative embodiment of a system for direct routing of a received network packet via an ingress computing node of a distributed router.

Referring now to FIG. 7, in an illustrative embodiment, a system 700 for direct routing of a received network packet 704 via the computing nodes 110 of the distributed router 102 (e.g., the cluster router) includes the ingress computing node 112, the egress computing node 116, and one or more other computing nodes 110 (e.g., the computing nodes 118). It should be appreciated that the ingress computing node 112, the egress computing node 116, and the other computing nodes 118 illustratively shown in FIG. 7 may include functionality, features, and/or structure substantially similar to the computing nodes 110 described above with reference to FIG. 1. In operation, the ingress computing node 112 of the distributed router 102 receives a network packet 704 from a source computing device (e.g., a network switch, a network router, an originating computing device, etc.) external to the distributed router 102. The ingress computing node 112 then generates a query bit set based on the destination internet protocol (IP) address included in the received network packet 704. The query bit set may be compared to a Bloom filter vector including an element bit set corresponding to each network routing entry maintained in the routing table 222 of the distributed router 102. Based on the comparison, the ingress computing node 112 determines a probable egress computing node 116 for transmission of the network packet 704 out of the distributed router 102. It should be appreciated that any of the other computing nodes 110 illustratively shown in FIG. 2 may instead receive the network packet 704 from the source computing device. As such, the particular computing node 110 receiving the network packet 704 may be designated as the "ingress" computing node 112.

Figure 8:
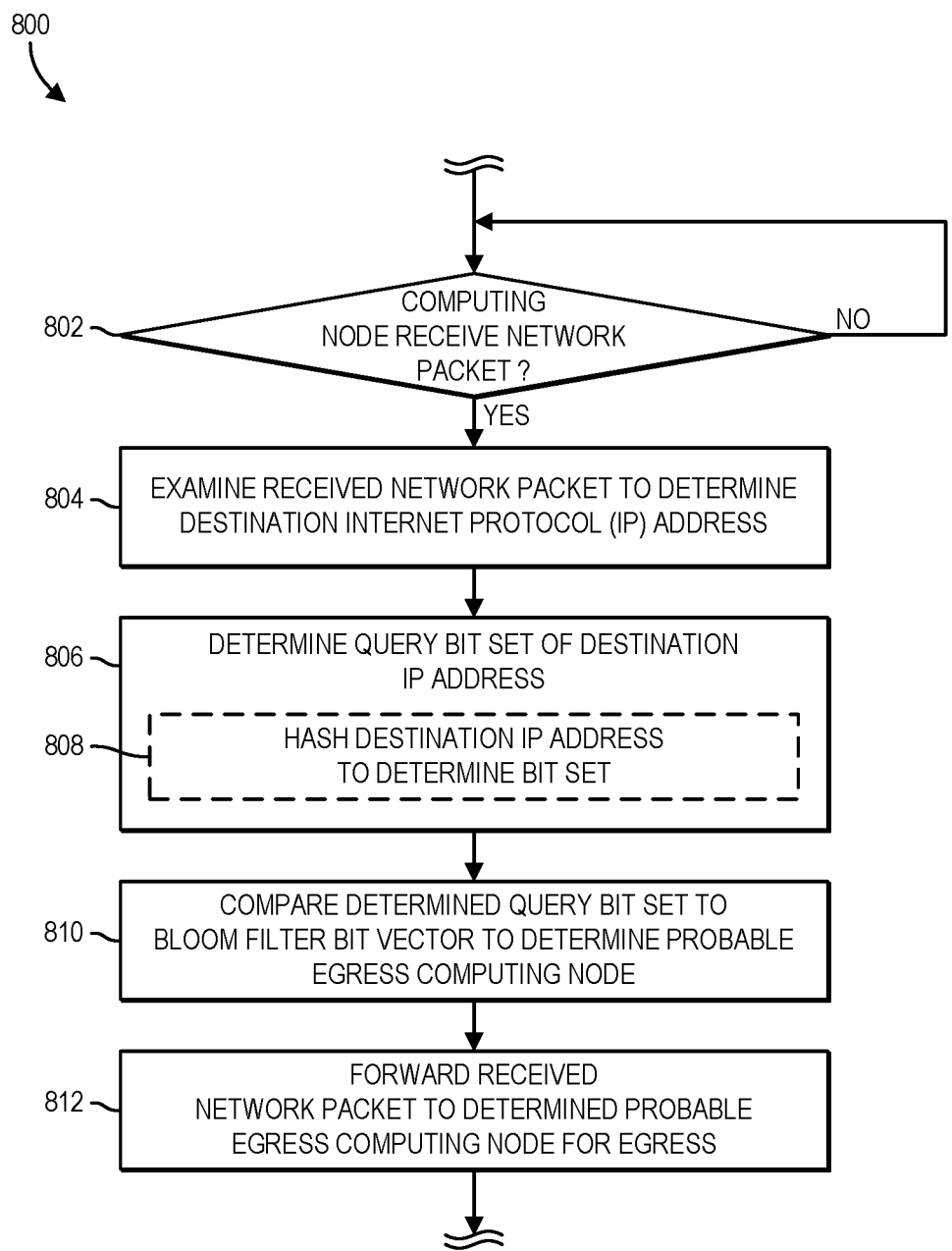
FIG. 8 is a simplified flow diagram of at least one embodiment of a method that may be executed by an ingress computing node of the distributed router of the system of FIG. 7 for direct routing of a received network packet.

Referring now to FIG. 8, the ingress computing node 112 may execute a method 800 for direct routing of a received network packet 704 via the computing nodes 110 of the distributed router 102 (e.g., the cluster router). The method 800 begins with block 802 in which the ingress computing node 112 determines whether a new network packet 704 is received from a computing device external to the distributed router 102 (e.g., a network switch, a network router, an originating computing device, etc.). To do so, the ingress computing node 112 may monitor the communication interface(s) 232 for the receipt of a new network packet 704. If in block 802, the ingress computing node 112 determines that a new network packet 704 is received, the method 800 advances to block 804. If, however, the ingress computing node 112 determines instead that a new network packet 704 has not been received, the method 800 loops back to block 802 and the ingress computing node 112 continues monitoring for receipt of a new network packet 704.

In block 804, the ingress computing node 112 examines the received network packet 704 to determine a target or destination of the packet. The target of the received network packet 704 may be a destination computing device directly connected to one of the computing nodes 110 of the distributed router 102 or an external destination computing device communicatively coupled to the distributed router 102 via one or more networks and/or networking devices. In some embodiments, the received network packet 704 may be embodied as an internet protocol (IP) packet including, among other types of information, a destination IP address of a target of the received network packet 704. In such embodiments, the ingress computing node 112 examines the packet header of the received network packet 704 to determine the destination IP address of the target.

In block 806, the ingress computing node 112 generates a query bit set based on the destination IP address of the network packet 704. In some embodiments, in block 808, the ingress computing node 112 hashes the binary representation of the destination IP address with a reference set of hash functions. In some embodiments, the ingress computing node 112 hashes the destination IP address with each hash function of the reference set of hash functions to generate a different bit of the query bit set. It should be appreciated that the reference set of hash functions may include any number of hash functions. Additionally, any suitable hash function may be used to hash the destination IP address.

In block 810, the ingress computing node 112 determines the probable egress computing node 116 of the distributed router 102. That is, the ingress computing node 112 determines the computing node 110 of the distributed router 102 most likely (e.g., having the highest probability) of being the egress computing node 116 for the network packet 704. To do so, in some embodiments, the ingress computing node 112 compares the query bit set generated from the destination IP address (or any combination of the header fields, e.g., 5-tuple) to a Bloom filter vector. The Bloom filter vector may include an element bit set generated for each network routing entry of the routing table 222 of the distributed router 102 using the same reference set of hash functions used to hash the destination IP address (or 5-tuple). As such, each bit of each element bit set may have been generated using a different hash function of the reference set of hash functions. In some embodiments, the ingress computing node 112 may determine whether the query bit set matches any of the element bit sets of the Bloom filter vector. In such a match exists, the ingress computing node 112 may utilize the corresponding network routing entry to determine the probable egress computing node 116.

In block 812, the ingress computing node 112 directly forwards the network packet 704 to the determined probable egress computing node 116 for further processing. For example, in some embodiments, the egress computing node 116 may transmit the received network packet 704 from the distributed router 102 towards its final destination (e.g., a directly connected computing device external to the distributed router 102, another network device, other networks, etc.).

It should be appreciated that although the illustrative embodiments described above refer to distributed routing table lookups based on the destination IP addresses of received network packets 104, 704, the computing nodes 110 of the distributed router 102 may perform distributed routing table lookups based on other types of information. For example, in some embodiments, a computing node 110 of the distributed router 102 may look up a routing table entry from the forwarding table 218 and/or the global routing table 222 based on any part or combination of a 5-tuple (e.g., the destination IP address, the destination port, the source IP address, the source port, a corresponding protocol) of a received network packet 104, 704. Additionally or alternatively, in some embodiments, the computing nodes 110 of the distributed router 102 may facilitate Layer 2 switching using information (e.g., a MAC address) determined from a received network packet 104, 704. In such embodiments, hash keys, index hash keys, and routing/forwarding tables may be generated from, or otherwise include, MAC address information.

EXAMPLES

Illustrative examples of the technologies disclosed herein are provided below. An embodiment of the technologies may include any one or more, and any combination of, the examples described below.

Example 1 includes an ingress computing node of a distributed router for distributed routing table lookup, the ingress computing node including a traffic ingress module to (i) receive a network packet, wherein each computing node of the distributed router includes a forwarding table to store a different set of network routing entries obtained from a routing table of the distributed router, (ii) generate a hash key based on a destination address included in the received network packet and indicative of a target of the received network packet, wherein the hash key identifies the computing node of the distributed router that stores the forwarding table that includes a network routing entry that corresponds to the destination address, (iii) determine, based on the hash key, an intermediate computing node of the distributed router to route the received network packet, and (iv) forward the received network packet to the intermediate computing node to route the received network packet.

Example 2 includes the subject matter of Example 1, and wherein the destination address includes a destination internet protocol address indicative of the target of the received network packet; and wherein to generate the hash key includes to generate a hash key based on the two least significant bits of the destination internet protocol address.

Example 3 includes the subject matter of any of Examples 1 and 2, and wherein to determine the intermediate computing node based on the hash key includes to compare the hash key to a plurality of flow filters to determine the intermediate computing node, wherein each flow filter associates a different index hash key to a different computing node of the distributed router.

Example 4 includes the subject matter of any of Examples 1-3, and further including a distributed router management module to at least one of synchronize the plurality of flow filters of the ingress computing node with other flow filters of other computing nodes of the distributed router or synchronize the routing table of the ingress computing node with other routing tables of the other computing nodes of the distributed router.

Example 5 includes the subject matter of any of Examples 1-4, and wherein the distributed router management module is further to (i) determine the availability of the intermediate computing node, (ii) determine a replacement intermediate computing node of the distributed router to route the received network packet in response to a determination that the intermediate computing node is unavailable, and (iii) update one or more of the plurality of flow filters based on the determined replacement intermediate computing node; and wherein to forward the received network packet to the intermediate computing node includes to forward the received network packet to the replacement intermediate computing node to route the received network packet.

Example 6 includes an ingress computing node of a distributed router for distributed routing table lookup, the ingress computing node including means for receiving a network packet, wherein each computing node of the distributed router includes a forwarding table to store a different set of network routing entries obtained from a routing table of the distributed router; means for generating a hash key based on a destination address included in the received network packet and indicative of a target of the received network packet, wherein the hash key identifies the computing node of the distributed router that stores the forwarding table including a network routing entry that corresponds to the destination address; means for determining an intermediate computing node of the distributed router to route the received network packet based on the hash key; and means for forwarding the received network packet to the intermediate computing node for routing of the received network packet.

Example 7 includes the subject matter of Example 6, and wherein the destination address includes a destination internet protocol address indicative of the target of the received network packet; and wherein the means for generating the hash key includes means for generating a hash key based on the two least significant bits of the destination internet protocol address.

Example 8 includes the subject matter of any of Examples 6 and 7, and wherein the means for determining the intermediate computing node based on the hash key includes means for comparing the hash key to a plurality of flow filters to determine the intermediate computing node, wherein each flow filter associates a different index hash key to a different computing node of the distributed router.

Example 9 includes the subject matter of any of Examples 6-8, and further including at least one of (i) means for synchronizing the plurality of flow filters of the ingress computing node with other flow filters of other computing nodes of the distributed router or (ii) means for synchronizing the routing table of the ingress computing node with other routing tables of the other computing nodes of the distributed router.

Example 10 includes the subject matter of any of Examples 6-9, and further including means for determining the availability of the intermediate computing node; means for determining a replacement intermediate computing node of the distributed router to route the received network packet in response to a determination that the intermediate computing node is unavailable; means for updating one or more of the plurality of flow filters based on the determined replacement intermediate computing node; and wherein the means for forwarding the received network packet to the intermediate computing node includes means for forwarding the received network packet to the replacement intermediate computing node for routing of the received network packet.

Example 11 includes a method for distributed routing table lookup via a distributed router, the method including receiving, by a first computing node of the distributed router, a network packet, wherein each computing node of the distributed router includes a forwarding table to store a different set of network routing entries obtained from a routing table of the distributed router; generating, by the first computing node, a hash key based on a destination address included in the received network packet and indicative of a target of the received network packet, wherein the hash key identifies the computing node of the distributed router that stores the forwarding table including a network routing entry that corresponds to the destination address; determining, by the first computing node, a second computing node of the distributed router to route the received network packet based on the hash key; and forwarding, by the first computing node, the received network packet to the second computing node for routing of the received network packet.

Example 12 includes the subject matter of Example 11, and wherein the destination address includes a destination internet protocol address indicative of the target of the received network packet; and wherein generating the hash key includes generating a hash key based on the two least significant bits of the destination internet protocol address.

Example 13 includes the subject matter of any of Examples 11 and 12, and wherein determining the second computing node based on the hash key includes comparing the hash key to a plurality of flow filters to determine the second computing node, wherein each flow filter associates a different index hash key to a different computing node of the distributed router.

Example 14 includes the subject matter of any of Examples 11-13, and further including at least one of (i) synchronizing, by the first computing node, the plurality of flow filters of the first computing node with other flow filters of other computing nodes of the distributed router or (ii) synchronizing, by the first computing node, the routing table of the first computing node with other routing tables of the other computing nodes of the distributed router.

Example 15 includes the subject matter of any of Examples 11-14, and further including determining, by the first computing node, the availability of the second computing node; determining, by the first computing node, a replacement second computing node of the distributed router to route the received network packet in response to a determination that the second computing node is unavailable; updating, by the first computing node, one or more of the plurality of flow filters based on the determined replacement second computing node; and wherein forwarding the received network packet to the second computing node includes forwarding the received network packet to the replacement second computing node for routing of the received network packet.

Example 16 includes a first computing node of a distributed router for distributed routing table lookup, the first computing node including a processor; and a memory having stored therein a plurality of instructions that when executed by the processor cause the first computing node to perform the method of any of Examples 11-15.

Example 17 includes one or more machine-readable media including a plurality of instructions stored thereon that in response to being executed result in a first computing node of a distributed router performing the method of any of Examples 11-15.

Example 18 includes an intermediate computing node of a distributed router for distributed routing table lookup, the intermediate computing node including a flow bounce module to (i) receive a network packet forwarded by an ingress computing node of the distributed router, wherein each computing node of the distributed router includes a forwarding table to store a different set of network routing entries obtained from a routing table of the distributed router, (ii) examine the received network packet to determine a destination address associated with a target of the received network packet, and (iii) determine, based on the destination address and the forwarding table of the intermediate computing node, an egress computing node of the distributed router to transmit the received network packet.

Example 19 includes the subject matter of Example 18, and wherein each routing entry of the different set of routing entries is indicative of an internet protocol address; and wherein the two least significant bits of the internet protocol address associated with each routing entry of the different set of routing entries are the same.

Example 20 includes the subject matter of any of Examples 18 and 19, and wherein the destination address includes a destination internet protocol address indicative of the target of the received network packet; and wherein the flow bounce module further to obtain the different set of routing entries from the routing table of the distributed router based on the two least significant bits of the internet protocol address associated with each routing entry of the routing table.

Example 21 includes the subject matter of any of Examples 18-20, and wherein to obtain the different set of routing entries includes to obtain one or more routing entries of the different set from the routing table of the distributed router in response to a determination that the one or more routing entries of the different set are not stored in the forwarding table of the intermediate computing node.

Example 22 includes the subject matter of any of Examples 18-21, and wherein to determine the egress computing node includes to determine an egress computing node different from the intermediate node to transmit the received network packet from the distributed router; and wherein the flow bounce module is further to forward the received network packet to the egress computing node different from the intermediate node for transmission of the received network packet from the distributed router.

Example 23 includes the subject matter of any of Examples 18-22, and wherein to determine the egress computing node of the distributed router includes to determine that the intermediate computing node is the egress computing node based on the destination address and the forwarding table of the intermediate computing node; and the intermediate computing node further including a traffic egress module to transmit the received network packet to the destination address associated with the target of the received network packet.

Example 24 includes the subject matter of any of Examples 18-23, and wherein to determine the egress computing node of the distributed router includes to compare the destination address to the forwarding table of the intermediate computing node; and wherein the flow bounce module further to compare the destination address to the routing table of the distributed router in response to a determination that a network routing entry that corresponds to the destination address is not stored in the forwarding table of the intermediate computing node.

Example 25 includes an intermediate computing node of a distributed router for distributed routing table lookup, the intermediate computing node including means for receiving a network packet forwarded by an ingress computing node of the distributed router, wherein each computing node of the distributed router includes a forwarding table to store a different set of network routing entries obtained from a routing table of the distributed router; means for examining the received network packet to determine a destination address associated with a target of the received network packet; and means for determining an egress computing node of the distributed router to transmit the received network packet based on the destination address and the forwarding table of the intermediate computing node.

Example 26 includes the subject matter of Example 25, and wherein each routing entry of the different set of routing entries is indicative of an internet protocol address; and wherein the two least significant bits of the internet protocol address associated with each routing entry of the different set of routing entries are the same.

Example 27 includes the subject matter of any of Examples 25 and 26, and wherein the destination address includes a destination internet protocol address indicative of the target of the received network packet; and further including means for obtaining the different set of routing entries from the routing table of the distributed router based on the two least significant bits of the internet protocol address associated with each routing entry of the routing table.

Example 28 includes the subject matter of any of Examples 25-27, and wherein the means for obtaining the different set of routing entries includes means for obtaining one or more routing entries of the different set from the routing table of the distributed router in response to a determination that the one or more routing entries of the different set are not stored in the forwarding table of the intermediate computing node.

Example 29 includes the subject matter of any of Examples 25-28, and wherein the means for determining the egress computing node includes means for determining an egress computing node different from the intermediate node to transmit the network packet from the distributed router; and further including means for forwarding the received network packet to the egress computing node different from the intermediate node for transmission of the received network packet from the distributed router.

Example 30 includes the subject matter of any of Examples 25-29, and wherein the means for determining the egress computing node of the distributed router includes means for determining that the intermediate computing node is the egress computing node based on the destination address and the forwarding table of the intermediate computing node; and further including means for transmitting the received network packet to the destination address associated with the target of the received network packet.

Example 31 includes the subject matter of any of Examples 25-30, and wherein the means for determining the egress computing node of the distributed router includes means for comparing the destination address to the forwarding table of the intermediate computing node; and further including means for comparing the destination address to the routing table of the distributed router in response to a determination that a network routing entry corresponding to the destination address is not stored in the forwarding table of the intermediate computing node.

Example 32 includes a method for distributed routing table lookup via a distributed router, the method including receiving, by a first computing node of the distributed router, a network packet forwarded by a second computing node of the distributed router, wherein each computing node of the distributed router includes a forwarding table to store a different set of network routing entries obtained from a routing table of the distributed router; examining, by the first computing node, the received network packet to determine a destination address associated with a target of the received network packet; and determining, by the first computing node, a third computing node of the distributed router to transmit the received network packet based on the destination address and the forwarding table of the first computing node.

Example 33 includes the subject matter of Example 32, and wherein each routing entry of the different set of routing entries is indicative of an internet protocol address; and wherein the two least significant bits of the internet protocol address associated with each routing entry of the different set of routing entries are the same.

Example 34 includes the subject matter of any of Examples 32 and 33, and wherein the destination address includes a destination internet protocol address indicative of the target of the received network packet; and further including obtaining, by the first computing node, the different set of routing entries from the routing table of the distributed router based on the two least significant bits of the internet protocol address associated with each routing entry of the routing table.

Example 35 includes the subject matter of any of Examples 32-34, and wherein obtaining the different set of routing entries includes obtaining one or more routing entries of the different set from the routing table of the distributed router in response to a determination that the one or more routing entries of the different set are not stored in the forwarding table of the first computing node.

Example 36 includes the subject matter of any of Examples 32-35, and wherein determining the third computing node of the distributed router includes determining a third computing node different from the first computing node to transmit the network packet from the distributed router; and further including forwarding, by the first computing node, the received network packet to the third computing node different from the first computing node for transmission of the received network packet from the distributed router.

Example 37 includes the subject matter of any of Examples 32-36, and wherein determining the third computing node of the distributed router includes determining that the first computing node is the third computing node based on the destination address and the forwarding table of the first computing node; and further including transmitting, by the first computing node, the received network packet to the destination address associated with the target of the received network packet.

Example 38 includes the subject matter of any of Examples 32-37, and wherein determining the third computing node of the distributed router includes comparing the destination address to the forwarding table of the first computing node; and further including comparing, by the first computing node, the destination address to the routing table of the distributed router in response to a determination that a network routing entry corresponding to the destination address is not stored in the forwarding table of the first computing node.

Example 39 includes a first computing node of a distributed router for distributed routing table lookup, the first computing node including a processor; and a memory having stored therein a plurality of instructions that when executed by the processor cause the first computing node to perform the method of any of Examples 32-38.

Example 40 includes one or more machine-readable media including a plurality of instructions stored thereon that in response to being executed result in a first computing node of a distributed router performing the method of any of Examples 32-38.

Example 41 includes a distributed router for distributed routing table lookup, the distributed router including a cluster of computing nodes including (i) a first computing node, (ii) a second computing node, and (iii) a third computing node, wherein each computing node of the cluster includes a forwarding table to store a different set of network routing entries obtained from a routing table of the distributed router; wherein the first computing node includes a traffic ingress module to (i) receive a network packet, (ii) generate a hash key based on a destination address included in the received network packet and indicative of a target of the received network packet, wherein the hash key identifies the computing node of the cluster of computing nodes that stores the forwarding table that includes a network routing entry that corresponds to the destination address, (iii) determine, based on the hash key, the second computing node from the cluster to route the received network packet, and (iv) forward the received network packet to the second computing node to route the received network packet; wherein the second computing node includes a flow bounce module to (i) receive the network packet forwarded by the first computing node of the cluster, (ii) examine the received network packet to determine the destination address associated with the target of the received network packet, (iii) determine, based on the destination address and the forwarding table of the second computing node, the third computing node from the cluster to transmit the received network packet, and (iv) forward the received network packet to the third computing node for transmission of the received network packet from the distributed router.

Example 42 includes the subject matter of Example 41, and wherein the destination address includes a destination internet protocol address indicative of the target of the received network packet; and wherein to generate the hash key includes to generate a hash key based on the two least significant bits of the destination internet protocol address.

Example 43 includes the subject matter of any of Examples 41 and 42, and wherein to determine the second computing node based on the hash key includes to compare the hash key to a plurality of flow filters to determine the second computing node, wherein each flow filter associates a different index hash key to a different computing node of the distributed router.

Example 44 includes a computing node of a distributed router for distributed routing table lookup, the computing node including a traffic ingress module to (i) receive a first network packet, wherein each computing node of the distributed router includes a forwarding table to store a different set of network routing entries obtained from a routing table of the distributed router, (ii) generate a hash key based on a destination address included in the received first network packet and indicative of a target of the received first network packet, wherein the hash key identifies the computing node of the distributed router that stores the forwarding table that includes a network routing entry that corresponds to the destination address of the first network packet, (iii) determine, based on the hash key, an intermediate computing node of the distributed router to route the received first network packet, and (iv) forward the received first network packet to the intermediate computing node to route the received network packet; and a flow bounce module to (i) receive a second network packet forwarded by another computing node of the distributed router, (ii) examine the received second network packet to determine a destination address associated with a target of the received second network packet, and (iii) determine, based on the destination address of the second network packet and the forwarding table of the computing node, an egress computing node of the distributed router to transmit the received second network packet.

Example 45 includes the subject matter of Example 44, and wherein the destination address of the first network packet includes a destination internet protocol address indicative of the target of the received first network packet; and wherein to generate the hash key includes to generate a hash key based on the two least significant bits of the destination internet protocol address of the first network packet.

Example 46 includes the subject matter of any of Examples 44 and 45, and wherein to determine the intermediate computing node based on the hash key includes to compare the hash key to a plurality of flow filters to determine the intermediate computing node, wherein each flow filter associates a different index hash key to a different computing node of the distributed router.

Example 47 includes the subject matter of any of Examples 44-46, and wherein each routing entry of the different set of routing entries is indicative of an internet protocol address; and wherein the two least significant bits of the internet protocol address associated with each routing entry of the different set of routing entries are the same.

Example 48 includes the subject matter of any of Examples 44-47, and wherein the destination address of the second network packet includes a destination internet protocol address indicative of the target of the received second network packet; and wherein the flow bounce module further to obtain the different set of routing entries from the routing table of the distributed router based on the two least significant bits of the internet protocol address associated with each routing entry of the routing table.

Example 49 includes the subject matter of any of Examples 44-48, and further including a traffic egress module to (i) receive a third network packet from another intermediate computing node of the distributed router and (ii) transmit the received third network packet from the distributed router.

Example 50 includes an ingress computing node of a distributed router for routing table lookup, the ingress computing node including a traffic ingress module to (i) receive a network packet, (ii) generate a query bit set based on a destination address included in the received network packet and indicative of a target of the received network packet, (iii) compare the query bit set to a Bloom filter vector to determine a probable egress computing node of the distributed router, wherein the Bloom filter vector includes an element bit set for each network routing entry of a routing table of the distributed router, and (iv) forward the received network packet to the probable egress computing node for transmission of the received network packet from the distributed router.

Example 51 includes the subject matter of Example 50, and wherein to generate the query bit set includes to hash the destination address with a reference set of hash functions, wherein each hash function for generation of a different bit of the query bit set.

Example 52 includes the subject matter of any of Examples 50 and 51, and wherein the traffic ingress module further to hash each network routing entry of the routing table with the reference set of hash functions to generate the element bit set for each network routing entry, wherein each hash function for generation of a different bit of the element bit set for each network routing entry.

Example 53 includes the subject matter of any of Examples 50-52, and wherein to determine the probable egress computing node includes to determine whether the query bit set matches the element bit set of a network routing entry of the Bloom filter vector.

Example 54 includes an ingress computing node of a distributed router for routing table lookup, the ingress computing node including means for receiving a network packet; means for generating a query bit set based on a destination address included in the received network packet and indicative of a target of the received network packet; means for comparing the query bit set to a Bloom filter vector to determine a probable egress computing node of the distributed router, wherein the Bloom filter vector includes an element bit set for each network routing entry of a routing table of the distributed router; and means for forwarding the received network packet to the probable egress computing node for transmission of the received network packet from the distributed router.

Example 55 includes the subject matter of Example 54, and wherein the means for generating the query bit set includes means for hashing the destination address with a reference set of hash functions, wherein each hash function for generating a different bit of the query bit set.

Example 56 includes the subject matter of any of Examples 54 and 55, and further including means for hashing each network routing entry of the routing table with the reference set of hash functions to generate the element bit set for each network routing entry, wherein each hash function for generating a different bit of the element bit set for each network routing entry.

Example 57 includes the subject matter of any of Examples 54-56, and wherein the means for determining the probable egress computing node includes means for determining whether the query bit set matches the element bit set of a network routing entry of the Bloom filter vector.

Example 58 includes a method for routing table lookup via a distributed router, the method including receiving, by an ingress computing node of the distributed router, a network packet; generating, by the ingress computing node, a query bit set based on a destination address included in the received network packet and indicative of a target of the received network packet; comparing, by the ingress computing node, the query bit set to a Bloom filter vector to determine a probable egress computing node of the distributed router, wherein the Bloom filter vector includes an element bit set for each network routing entry of a routing table of the distributed router; and forwarding, by the ingress computing node, the received network packet to the probable egress computing node for transmission of the received network packet from the distributed router.

Example 59 includes the subject matter of Example 58, and wherein generating the query bit set includes hashing the destination address with a reference set of hash functions, wherein each hash function for generating a different bit of the query bit set.

Example 60 includes the subject matter of any of Examples 58 and 59, and further including hashing, by the ingress computing node, each network routing entry of the routing table with the reference set of hash functions to generate the element bit set for each network routing entry, wherein each hash function for generating a different bit of the element bit set for each network routing entry.

Example 61 includes the subject matter of any of Examples 58-60, and wherein determining the probable egress computing node includes determining whether the query bit set matches the element bit set of a network routing entry of the Bloom filter vector.

Example 62 includes an ingress computing node of a distributed router for distributed routing table lookup, the ingress computing node including a processor; and a memory having stored therein a plurality of instructions that when executed by the processor cause the ingress computing node to perform the method of any of Examples 58-61.

Example 63 includes one or more machine-readable media including a plurality of instructions stored thereon that in response to being executed result in an ingress computing node of a distributed router performing the method of any of Examples 58-61.

The invention claimed is:

1. An intermediate computing node of a distributed router that includes an ingress computing node, the intermediate computing node, and an egress computing node for distributed routing table lookup, the intermediate computing node comprising:
   a memory;
   a processor coupled to the memory; and
   a flow bounce module to (i) receive a network packet forwarded by the ingress computing node of the distributed router, wherein each intermediate computing node of the distributed router comprises a forwarding table to store a different set of network routing entries obtained from a routing table of the distributed router, wherein each routing entry of the different set of network routing entries is indicative of an internet protocol address and the two least significant bits of the internet protocol address associated with each routing entry of the different set of network routing entries are the same, (ii) examine the received network packet to determine a destination address associated with a target of the received network packet, and (iii) determine, based on the destination address and the forwarding table of the intermediate computing node, the egress computing node of the distributed router to transmit the received network packet.

2. The intermediate computing node of claim 1, wherein the destination address comprises a destination internet protocol address indicative of the target of the received network packet; and
   wherein the flow bounce module is further to obtain the different set of network routing entries from the routing table of the distributed router based on the two least significant bits of the internet protocol address associated with each routing entry of the routing table.

3. The intermediate computing node of claim 2, wherein to obtain the different set of network routing entries comprises to obtain one or more routing entries of the different set of network routing entries from the routing table of the distributed router in response to a determination that the one or more routing entries of the different set of network routing entries are not stored in the forwarding table of the intermediate computing node.

4. The intermediate computing node of claim 3, wherein to determine the egress computing node of the distributed router comprises to compare the destination address to the forwarding table of the intermediate computing node; and
   wherein the flow bounce module is further to compare the destination address to the routing table of the distributed router in response to a determination that a network routing entry that corresponds to the destination address is not stored in the forwarding table of the intermediate computing node.

5. The intermediate computing node of claim 1, wherein to determine the egress computing node comprises to determine an egress computing node different from the intermediate node to transmit the received network packet from the distributed router; and
   wherein the flow bounce module is further to forward the received network packet to the egress computing node different from the intermediate node for transmission of the received network packet from the distributed router.

6. The intermediate computing node of claim 1, wherein to determine the egress computing node of the distributed router comprises to determine that the intermediate computing node is the egress computing node based on the destination address and the forwarding table of the intermediate computing node; and
   the intermediate computing node further comprising a traffic egress module to transmit the received network packet to the destination address associated with the target of the received network packet.

7. One or more non-transitory machine-readable media comprising a plurality of instructions stored thereon that in response to being executed by an intermediate computing node of a distributed router that includes an ingress computing node, the intermediate computing node, and an egress computing node, cause the intermediate computing node to:
   receive a network packet forwarded by the ingress computing node of the distributed router, wherein each intermediate computing node of the distributed router comprises a forwarding table to store a different set of network routing entries obtained from a routing table of the distributed router, wherein each routing entry of the different set of network routing entries is indicative of an internet protocol address and the two least significant bits of the internet protocol address associated with each routing entry of the different set of network routing entries are the same;
   examine the received network packet to determine a destination address associated with a target of the received network packet; and
   determine, based on the destination address and the forwarding table of the intermediate computing node, the egress computing node of the distributed router to transmit the received network packet.

8. The one or more non-transitory machine-readable media of claim 7, wherein the destination address comprises a destination internet protocol address indicative of the target of the received network packet; and
   wherein the plurality of instructions further cause the intermediate computing node to obtain the different set of network routing entries from the routing table of the distributed router based on the two least significant bits of the internet protocol address associated with each routing entry of the routing table.

9. The one or more non-transitory machine-readable media of claim 8, wherein to obtain the different set of network routing entries comprises to obtain one or more routing entries of the different set of network routing entries from the routing table of the distributed router in response to a determination that the one or more routing entries of the different set of network routing entries are not stored in the forwarding table of the intermediate computing node.

10. The one or more non-transitory machine-readable media of claim 7, wherein to determine the egress computing node comprises to determine an egress computing node different from the intermediate node to transmit the received network packet from the distributed router; and
wherein the plurality of instructions further cause the intermediate computing node to forward the received network packet to the egress computing node different from the intermediate node for transmission of the received network packet from the distributed router.

11. The one or more non-transitory machine-readable media of claim 7, wherein to determine the egress computing node of the distributed router comprises to determine that the intermediate computing node is the egress computing node based on the destination address and the forwarding table of the intermediate computing node; and
wherein the plurality of instructions further cause the intermediate computing node to transmit the received network packet to the destination address associated with the target of the received network packet.

12. The one or more non-transitory machine-readable media of claim 7, wherein to determine the egress computing node of the distributed router comprises to compare the destination address to the forwarding table of the intermediate computing node; and
wherein the plurality of instructions further cause the intermediate computing node to compare the destination address to the routing table of the distributed router in response to a determination that a network routing entry that corresponds to the destination address is not stored in the forwarding table of the intermediate computing node.

13. An intermediate computing node of a distributed router that includes an ingress computing node, the intermediate computing node, and an egress computing node for distributed routing table lookup, the intermediate computing node comprising:
means for receiving a network packet forwarded by the ingress computing node of the distributed router, wherein each intermediate computing node of the distributed router comprises a forwarding table to store a different set of network routing entries obtained from a routing table of the distributed router, wherein each routing entry of the different set of network routing entries is indicative of an internet protocol address and the two least significant bits of the internet protocol address associated with each routing entry of the different set of network routing entries are the same;
means for examining the received network packet to determine a destination address associated with a target of the received network packet; and
means for determining the egress computing node of the distributed router to transmit the received network packet based on the destination address and the forwarding table of the intermediate computing node.

14. A method for distributed routing table lookup via a distributed router that includes multiple computing nodes, the method comprising:
receiving, by a first computing node of the distributed router, a network packet forwarded by a second computing node of the distributed router, wherein the first computing node is one of multiple intermediate computing nodes of the distributed router and each intermediate computing node of the distributed router comprises a forwarding table to store a different set of network routing entries obtained from a routing table of the distributed router wherein each routing entry of the different set of network routing entries is indicative of an internet protocol address and the two least significant bits of the internet protocol address associated with each routing entry of the different set of network routing entries are the same;
examining, by the first computing node, the received network packet to determine a destination address associated with a target of the received network packet; and
determining, by the first computing node, a third computing node of the distributed router to transmit the received network packet based on the destination address and the forwarding table of the first computing node.

15. The method of claim 14, wherein the destination address comprises a destination internet protocol address indicative of the target of the received network packet; and further comprising:
obtaining, by the first computing node, the different set of network routing entries from the routing table of the distributed router based on the two least significant bits of the internet protocol address associated with each routing entry of the routing table.

16. The method of claim 15, wherein obtaining the different set of network routing entries comprises obtaining one or more routing entries of the different set of network routing entries from the routing table of the distributed router in response to a determination that the one or more routing entries of the different set of network routing entries are not stored in the forwarding table of the first computing node.

17. The method of claim 14, wherein determining the third computing node of the distributed router comprises determining a third computing node different from the first computing node to transmit the network packet from the distributed router; and further comprising:
forwarding, by the first computing node, the received network packet to the third computing node different from the first computing node for transmission of the received network packet from the distributed router.

* * * * *